E. A. JEFFERY.
Griddle.
No. 3,276. Reissued Jan'y 26, 1869.
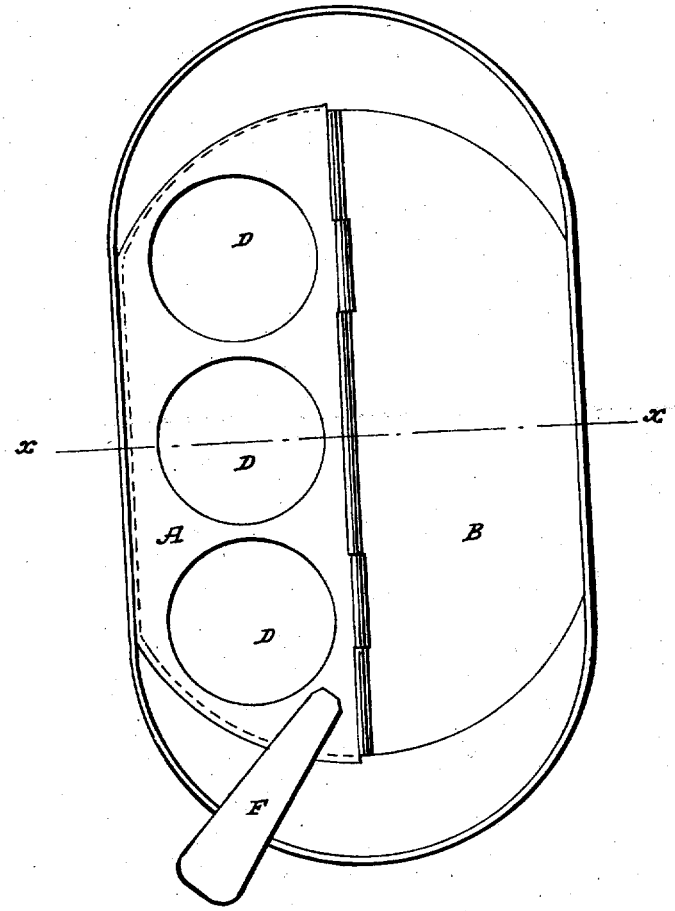
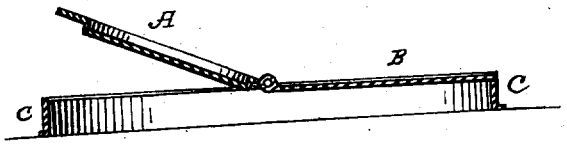
WITNESSES:
Thos Tusche
J. A. Service
INVENTOR.
Edwin A. Jeffery
per Munn & Co
Attorneys.
N. PETERS, Photo-Lithographer, Washington, D. C.

United States Patent Office.

EDWIN A. JEFFERY, OF TRAPPE, MARYLAND, ASSIGNEE, BY MESNE ASSIGNMENTS, OF HIMSELF.

*Letters Patent No.* 68,202, *dated August* 27, 1867; *reissue No.* 3,276, *dated January* 26, 1869.

IMPROVEMENT IN GRIDDLES.

The Schedule referred to in these Letters Patent and making part of the same.

*To all whom it may concern:*

Be it known that I, EDWIN A. JEFFERY, of Trappe, in the county of Talbot, and State of Maryland, have invented a new and useful Improvement in Griddles; and I do hereby declare that the following is a full, clear, and exact description thereof, which will enable others skilled in the art to make and use the same, reference being had to the accompanying drawings, forming part of this specification.

This invention relates to a new and improved method of constructing griddles for baking cakes; and It consists in making the griddle of two plates, hinged together, so that one of them can be swung over, and in forming recesses in one of the plates for the reception of the batter from which the cake is to be made.

The batter is put into the recesses, and when baked on one side, the plate containing them is turned so as to dump the cakes upon the other plate, where their other side is baked.

Figure 1 is a plan or top view of the griddle, and

Figure 2 is a cross-section through the line $x\ x$.

Similar letters of reference indicate corresponding parts.

The griddle is formed of two plates, A and B. They are hinged together, and may, if desired, be supported by a rim or flange, C, which raises them a sufficient distance above the stove to allow a chamber or space for hot air beneath; but such rim may be dispensed with.

The plate A of the griddle has recesses, D, for the cakes, which recesses may be circular, or of any other desired shape, and of a depth sufficient for the thickness of the cakes.

By being hinged to B, the plate A can be reversed, or turned bottom side up.

F is a handle by which the part A may be operated, but which may also be left off.

In using the griddle, the batter is placed in the recesses D, and when the under side is sufficiently baked, the plate A is swung over, and the partially-baked cakes are thereby turned and deposited upon the plate B, where the baking is completed.

After turning and dumping the cakes, the plate A is turned back, and the recesses are filled again, and the operation is thus repeated, and continued on both plates, at the same time, as long as desired.

Having thus described my invention,

I claim as new, and desire to secure by Letters Patent—

A griddle, consisting essentially of two plates, A and B, of which one plate can be swung to dump the cakes upon the other, as set forth.

EDWIN A. JEFFERY.

Witnesses:

FRANK BLOCKLEY,
ALEX. F. ROBERTS.